UNITED STATES PATENT OFFICE.

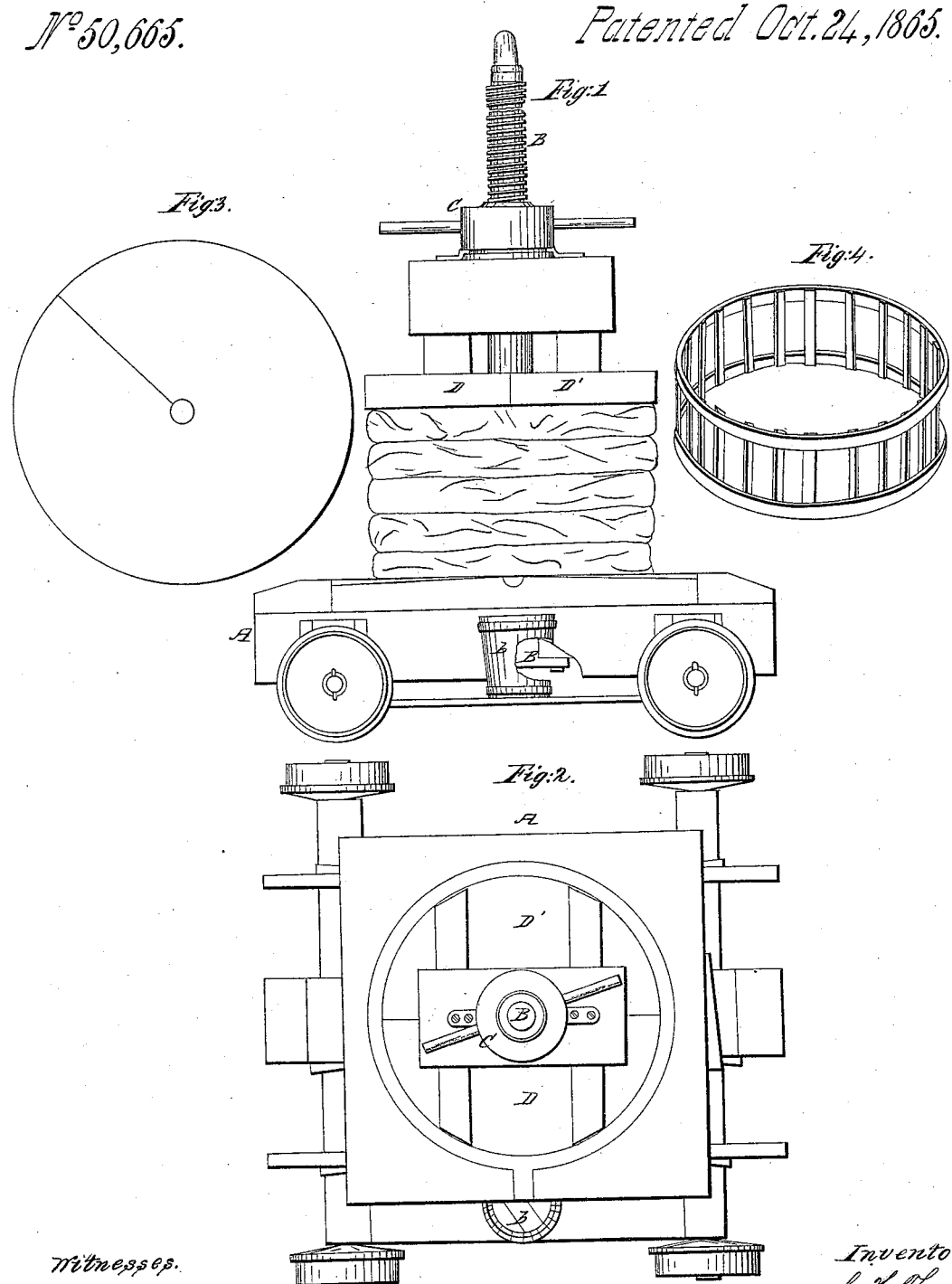

CHARLES H. THOMAS, OF MILTON, NEW YORK, ASSIGNOR TO HIMSELF AND HERMON THOMAS, OF SAME PLACE.

IMPROVEMENT IN CIDER-PRESSES.

Specification forming part of Letters Patent No. 50,665, dated October 24, 1865.

*To all whom it may concern:*

Be it known that I, C. H. THOMAS, of Milton, in the county of Ulster and State of New York, have invented certain new and useful Improvements in Cider-Presses; and I do hereby declare that the following is a full, clear, and exact description thereof, reference being had to the accompanying drawings, and to the letters of reference marked thereon, making part of this specification—

Figure 1 being a side elevation, and Fig. 2 a top-plan view, of the press with a "cheese" laid up thereon.

The nature of my invention consists in constructing a press in which no frame but the platform is required, and in which the screw in pressing is made to pull instead of pushing, as is ordinarily the case.

To enable others skilled in the art to construct and use my invention, I will proceed to describe it.

A represents a platform or frame mounted on wheels, and having a tight flooring thereon to receive and support the pomace or other material to be pressed. A circular groove, *a*, is cut in the upper surface of the platform, as shown in Fig. 2, to receive and conduct the juice into a vessel, *b*, which may be located by the side of the platform, as shown in the drawings.

A strong screw, B, is secured to the center of the frame or platform A, extending down through, and being firmly attached to the under side thereof, as shown in Fig. 1. A nut, C, is fitted on the screw B, said nut being provided with holes for the insertion of the end of a lever or levers for turning the same; or, if desired, the nut may be operated by gearing, or in any other suitable manner. This constitutes all of my press proper. To use it I commence by first providing pieces of coarse sacking, which I cut in a circular form, somewhat larger in diameter than the cheese that I intend to make. I then cut a slit from the center to the outer edge of these pieces of sacking, as shown in Fig. 3, so that it can be placed around the screw B, and have the latter in the center thereof. I place the hoop shown in Fig. 4 over the screw, then place a piece of the sacking therein, leaving its edges hanging over outside of the hoop, and fill in the pomace equally all around the screw until the hoop is nearly full. I then turn the outer edges of the sacking over in on top of the pomace, and, laying another piece of sacking thereon and raising the hoop, proceed as before, and so continue until the cheese is completed. I then place the planks D D' on the cheese, with suitable blocks, and screw down the nut C.

It will be observed that by this arrangement I dispense with the heavy and expensive frame usually made use of in cider-presses, and that consequently there is no necessity for removing and replacing the lever every time a half-turn or less is given to the screw, as is ordinarily the case, there being no frame to prevent the person or horse, in case one is used, from traveling round in a continuous circle. By making the cheese round I avoid the corners which occur when made square in the usual manner, and as all portions of the periphery of the cheese are equidistant from the screw it follows that all portions will be pressed equally.

Another advantage is that, as the platform and planks as the top will naturally yield somewhat as the pressure is applied, they will be brought nearest together at the center, where the screw bears upon them, and thus, as the pressure is applied at the center of the cheese first, the juice will be driven from the center outward, thus securing a thorough expulsion of the juice.

By using the sacking I get rid of the use of straw, and thereby keep a great amount of chaff, dust, and dirt from becoming mixed with the juice; but the great advantage of my press is that, by applying the pressure in the manner shown, the screw is made to pull or draw, instead of pushing, and thus I avoid all tendency of the screw to buckle or bend, and also prevent the cheese from settling over to one side. It is obvious that where the pressure is applied in this manner the screw will stand a much greater amount of strain than where it is made to press by pushing.

By mounting the press on car-wheels, as shown, it can be easily run on a temporary railway of wood or iron, and thus moved to the grinding-vat when the cheese is to be made up, and as readily moved to a tank into which it is desired to have the juice flow. So, also, when the pomace is to be thrown out, the press can be run to the door, and the refuse be thrown out at once, thus saving the time and labor of carrying it out by hand.

I usually strain the juice through flannel placed within the sacking, and thus render it very clean and pure.

Having thus fully described my invention, what I claim is—

1. A cider-press consisting of the platform A, mounted on wheels and provided with the stationary screw B and nut C, arranged and operating as and for the purpose set forth.

2. In combination with a press, constructed as described, the use of the sacking, as and for the purpose set forth.

CHAS. H. THOMAS.

Witnesses:
W. C. DODGE,
J. F. CALLAN.